United States Patent [19]

Mochizuki et al.

[11] Patent Number: 5,253,335
[45] Date of Patent: Oct. 12, 1993

[54] HIDDEN-SURFACE PROCESSING DEVICE, ANTI-ALIASING METHOD AND THREE-DIMENSIONAL GRAPHICS PROCESSING APPARATUS

[75] Inventors: Yoshiyuki Mochizuki, Hirakata; Takeru Ohgi, Osaka, both of Japan

[73] Assignee: Matsushita Electric Industrial Co., Ltd., Osaka, Japan

[21] Appl. No.: 569,443

[22] Filed: Aug. 20, 1990

[30] Foreign Application Priority Data

Aug. 25, 1989 [JP] Japan .................... 1-218797

[51] Int. Cl.$^5$ ............................ G06F 15/72
[52] U.S. Cl. .................... 395/122; 395/132; 395/163
[58] Field of Search ........... 364/522, 521; 340/729; 395/132, 163, 122

[56] References Cited

U.S. PATENT DOCUMENTS

| | | | |
|---|---|---|---|
| 4,371,872 | 2/1983 | Rossman | 340/728 |
| 4,594,673 | 6/1986 | Holly | 364/522 |
| 4,658,247 | 4/1987 | Gharachorloo | 364/521 X |
| 4,901,064 | 2/1990 | Deering | 364/522 X |
| 4,930,091 | 5/1990 | Schroeder et al. | 364/522 |
| 4,945,500 | 7/1990 | Deering | 364/522 |
| 5,043,922 | 8/1991 | Matsumoto | 364/522 |

FOREIGN PATENT DOCUMENTS 62-100878  5/1987  Japan .

OTHER PUBLICATIONS

Nishizawa, et al, "A Hidden Surface and Shading Processor (HSSP) with a Systolic Architecture", IEEE Journal of Solid-State Circuits, vol. 23, No. 5, pp. 1236-1240, Oct. 1988.

Fujimoto, et al, "A 3-D Graphics Display System with Depth Buffer and Pipeline Processor", Computer Graphics and Applications, vol. 4, No. 6, pp. 11-23, Jun. 1984.

Gharachorloo et al, "Super Buffer: A Systolic VLSI Graphics Engine for Real Time Raster Image Generation" (1985 Chapel Hill Conference on VLSI, pp. 285-305).

Primary Examiner—Mark K. Zimmerman
Attorney, Agent, or Firm—Stevens, Davis, Miller & Mosher

[57] ABSTRACT

A graphic display device displays a three-dimensional polyhedral object on a two-dimensional screen in accordance with hidden surface processing. The device includes a plurality of pixel processors corresponding to each of the pixels on one scan line on the screen. The hidden surface processing device includes an error register which stores data relating to errors of a plane segment on one scan line nearest to pixels at its boundaries and error information indicating whether an error is due to a left boundary or a right boundary, and an error data bus which reads the storage contents of the error register together with luminance data. The hidden surface processing device obtains luminance data relating to a plane to be displayed at high speed. The luminance data and the boundary error data are used for anti-aliasing processing. An anti-aliasing method executes corrections for boundaries of the pixels using two successive pixels on one scan line. The anti-aliasing method functions in real time even when the luminance data and the error data corresponding to one scan line are successively produced.

6 Claims, 14 Drawing Sheets

FIG. 3A

| | CONTENTS |
|---|---|
| 0 0 | NOT BOUNDARY |
| 0 1 | RIGHT BOUNDARY |
| 1 0 | LEFT BOUNDARY |

FIG. 3B

| | CTRL | A PORT | B PORT |
|---|---|---|---|
| $T_1$ | IN FLAG | X(IN=0) dX(IN=1) | dX |
| $T_2$ | — | Z | Z' |
| $T_3$ | — | Z | — |
| $T_4$ | — | I | I' |
| $T_5$ | — | $E_L$ | $E_R$ |

FLOW OF SEGMENT TOKEN

FLOW OF SWEEP TOKEN

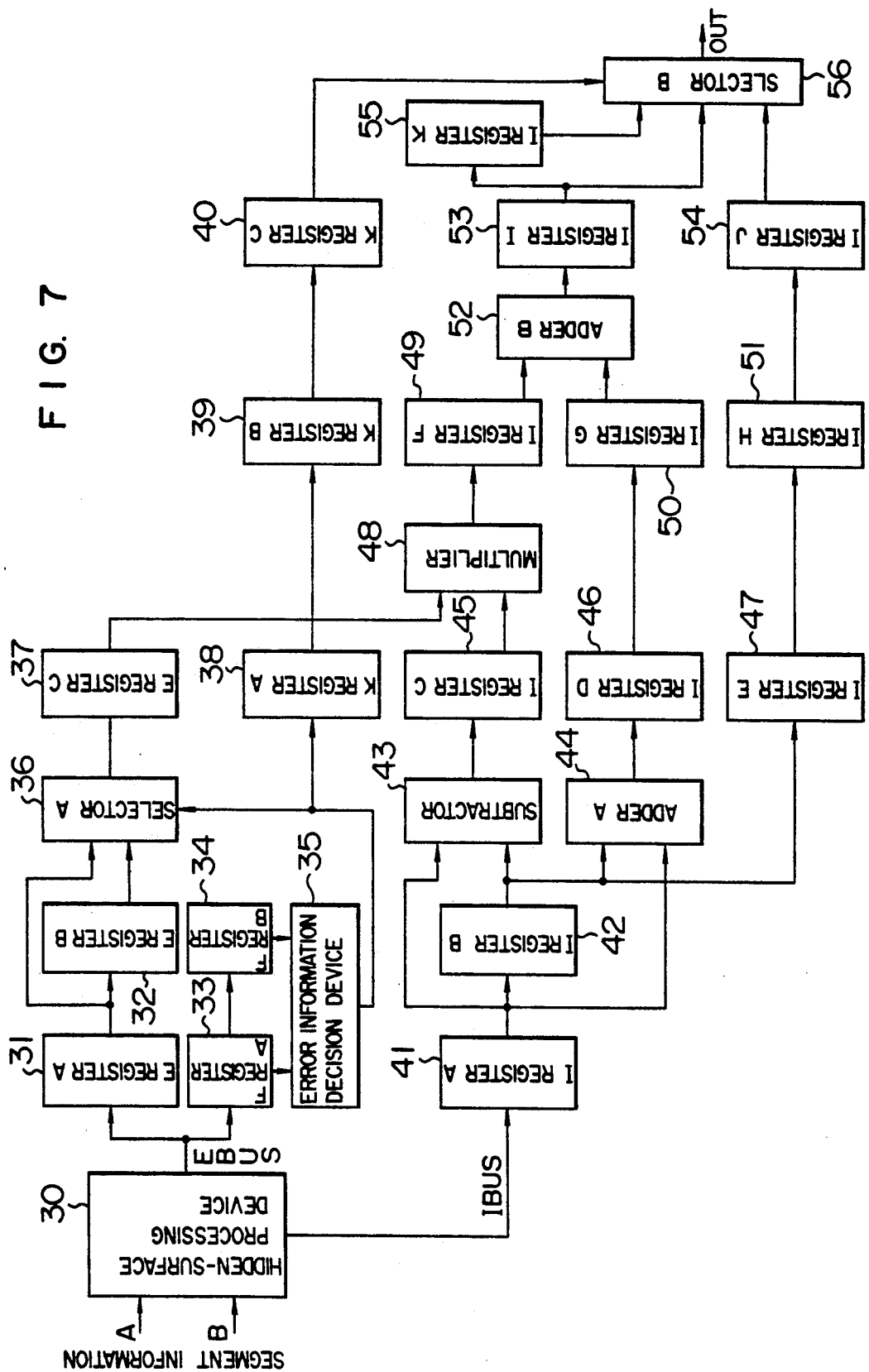

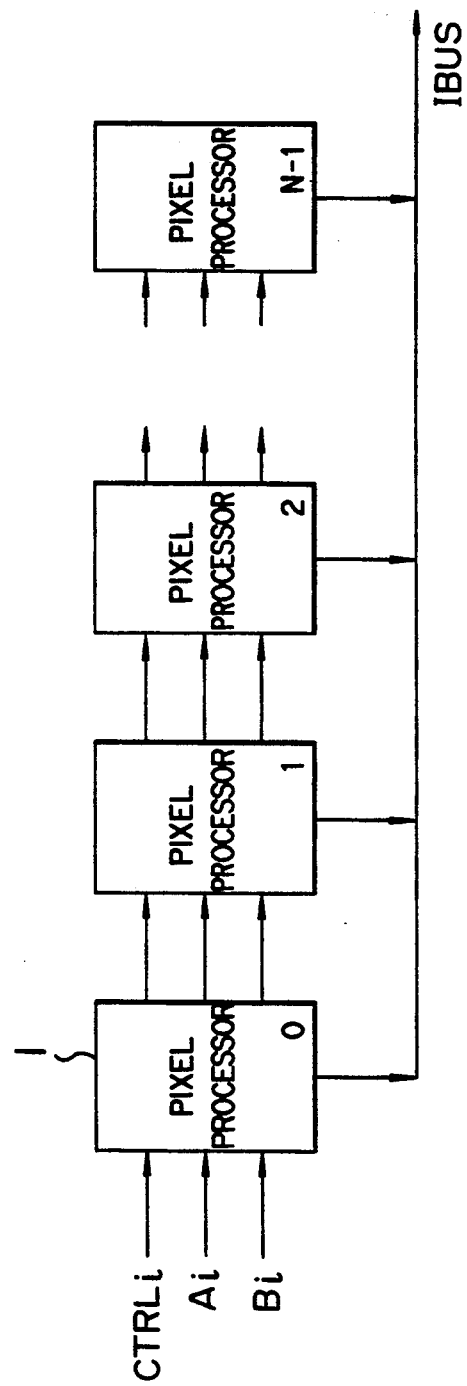

FIG. 11

|  | CTRL | A PORT | B PORT |
|---|---|---|---|
| $T_1$ | IN FLAG | $X$ (IN = 0)<br>$dX$ (IN = 1) | $dX$ |
| $T_2$ | — | $Z$ | $Z'$ |
| $T_3$ | — | $Z$ | — |
| $T_4$ | — | $I$ | $I'$ |

HIDDEN-SURFACE PROCESSING DEVICE, ANTI-ALIASING METHOD AND THREE-DIMENSIONAL GRAPHICS PROCESSING APPARATUS

BACKGROUND OF THE INVENTION

The present invention relates to a graphic processing device and method in a field of computer graphics.

When a three-dimensional object is projected on a two-dimensional screen, an object partially or entirely shades other objects behind it. In order to obviate such an undesired phenomenon, a scan-line algorithm has been proposed which executes sequential processings using a general-purpose processor. A Z-buffer algorithm has been also proposed which is suitable to be implemented in hardware. The scan-line algorithm, when luminance data of each of pixels are displayed for each raster scan as in CRT, uses a very strong correlation between a pixel and adjacent pixels or a pixel on a subsequent scan line. Although this algorithm is suitable to execute sequential processings, it has a disadvantage of requiring a large number of calculations and complicating control logic. On the other hand, the Z-buffer algorithm previously stores for each of pixels the color and luminance (represented by the luminance) of a plane displayed on each pixel and the depth of the plane, and compares the depth of a new plane with the stored depth whenever the new plane is input; then only when the depth of the new plane is smaller than the stored depth, the stored depth is updated and also the luminance of the new plane is registered. Therefore, although the Z-buffer algorithm requires depth registers (generally called 'Z-buffers') to be provided for all the pixels and so a very large memory circuit, it has an advantage of comparatively simple control logic.

As an intermediate method of those hiddensurfaces elimination algorithms, a method using a correlation between scan lines and the Z-buffer algorithm within one scan line is disclosed in N. Gharachorloo and C. Pottole, "Super buffer: A systolic VLSI graphics engine for real time raster image generation", 1985 Chapel Hill Conference on Very Large Scale Integration, pp. 285-305. The hardware to implement this method, however, is too large so that it is difficult to realize the entire array in LSI.

The inventors of the present invention proposed a hidden-surface processing device disclosed in JP-A-62-100878 which is suitable to be realized in LSI with less hardware.

FIG. 8 is a system block diagram of the proposed hidden-surface processing device. FIG. 9 is a view showing the details of each of pixel processors which constitute the hidden-surface processing device. In FIGS. 8 and 9, 1 is a pixel processor corresponding to each of N pixels on one scan line; 10 is a depth register for registering the depth coordinate of a plane nearest to the screen in terms of pixel positions; 11 is a luminance register for registering the luminance information of the plane; and 12 is an adder for deciding whether or not the pixel processor is within a range where a plane segment is located, adding displacement in the depth, comparing depth data and adding a displacement in luminance data in a time division manner.

Referring to a conceptual view of FIG. 10, explanation will be made on the operation of the hidden-surface processing device thus constructed.

A plane 200 is defined in a three-dimensional space (generally called a normalized device coordinate system) as shown in FIG. 10 in which a depth coordinate, a z-coordinate is added to the x-y coordinate system corresponding to an M×N two-dimensional screen. The plane 200 is projected on the x-y plane to be displayed on the screen. With the raster-scan CRT, this processing is performed for each horizontal scan line so that it will be performed on the section 201 provided by cutting the plane 200 with a plane (generally called a scan line plane) passing the present scan line and in parallel to the x-z plane. This section 201 is called a plane segment. The individual plane segment has elements of a left end point coordinate (XL, ZL), the number of successive pixels (dX), a z-coordinate displacement for each pixel (Z'), luminance information I at the left end point, and a luminance displacement I' for each pixel. The token having these items of information is input in a manner divided into an A input port Ai and a B input port Bi to a left end pixel processor 1 of the pixel processors formed in an array as shown in FIG. 8. Control information CTRLi includes IN flag information indicative of that the corresponding pixel processor is within a range where the plane segment in question is located The information given to the respective ports in a time divisional manner are tabulated as shown in FIG. 11.

The operation of each pixel processor is as follows.

At a first timing T1, data at the A input port Ai and an all 1 pattern are supplied to an adder 12 to provide the subtraction result of the A input data minus 1. If the IN flag=0, and the subtraction result is negative, it means that the pixel processor has entered the range where the plane segment is located. Then, the data dX at the B input port Bi is shifted to the A port by the selector 14 to enter the latch 17. Also the IN flag is inverted to 1 to enter the latch 16. If the IN flag=1, and the subtraction result is negative, it means that the pixel processor has gone out from range where the plane is located. Then, the IN flag is inverted to 0 to output the negative value (the maximum value in integers with no sign) to the A output port as it is. In other cases, the CTRLi is output to CTRLo as it is and the addition result is output to the A output port Ao.

At a second timing T2, if the IN flag=1, Z at the A input port Ai and Z' at the B input port Bi are added to produce the addition result at the A output port Ao. If the IN flag=0, Z at Ai is output to Ao as it is without being updated.

At a third timing T3, Z at Ao at the timing T2 is held as it is. Then, with the IN flag=1, Z at Ai and Zb in the depth register 10 are compared by the adder 12. If the comparison result is Z<Zb, Z at Ai will be stored in the depth register 10.

At a fourth timing T4, if the IN flag=1 and the above comparison result is Z<Zb, I at the B input port Bi will be stored in the luminance register 11, and I at Ai and I; at Bi are added to produce the addition result at Ao. In other cases, I at Ai is output to Ao as it is without being updated.

At the above four all timings, the value at Bi is output at Bo as it is through the latch 18.

FIG. 12A shows the state where the token as described above flows along the array of pixel processors while being subjected to the processing by each pixel processor. Upon completion of processing all the tokens on one scan line, the luminance data of the segment nearest to the corresponding pixel positions is stored in the luminance register in each pixel processor.

The operation of each pixel processor for a sweep token will be explained which reads the contents of the luminance register of each pixel processor and initializes the contents of a depth register and the luminance register As understood from the above description, it is possible to insert, in the timing slot of T2 or T3 unused on the bus of the CTRL signal, a discriminator for discriminating whether the token is a plane segment or a sweep token At the first timing T1, the number DPR of displayed pixels on one scan line is received in place of X, and 1 is subtracted from it to count the remaining number of displayed pixels. Then, that the subtraction result is negative means that the token has deviated from the display range so that the IN flag is inverted to 0. At the second timing T2, if the token is within the display range with IN flag=1, the pixel processor 1 sends the data in the luminance register 11 to the luminance data bus. At the third timing T3, if the token is within the display range with IN flag=1, an initial value Z back is stored in the depth register 10. At the fourth timing T4, if the token is within the display range with IN flag=1, an initial value I back is stored in the luminance register 11.

FIG. 12B shows the state where the sweep token as described above flows along the array of pixel processors while being subjected to the processing by each pixel processor. In this way, the luminance data of the segment nearest to the pixels on one scan line are successively read out from each pixel processor.

Meanwhile, the conventional anti-aliasing algorithm along a scan line is disclosed in e.g. 'COMPUTER GRAPHICS' by E. Nakamae, edited by DENSITSUSIN GAKKAI, 1987, PP. 183-186.

This anti-aliasing algorithm will be explained below.

If the x coordinate of a boundary of a plane segment has a minimum value XMIN and a maximum value XMAX within the same pixel as shown in FIG. 13A, the shaded portion is a trapezoid. Then, the luminance of the pixel is corrected by the rule $X0*IL+(1-X0)*IR$, assuming that the luminance in the shaded portion of the pixel is IR and that in the remaining left portion is IL, and the width X0 of the remaining portion on the X central line is X0 of the pixel. Further, if the boundary of the plane segment extends over some pixels as shown in FIG. 13B, the luminance of each of the intermediate pixels is corrected by the rule of $Yn*IL+(1-Yn)*IR(n=0, 1, 2, ...)$ assuming that the width of the remaining portion on the Y central line of each of the intermediate pixels is Y0, Y1, Y2 ... Yn; this is also because the shaded portions in the intermediate pixels other than the pixels at both ends are trapezoids. The luminance of the first and the last pixel can be corrected on the basis of that they include a triangle and a pentagon (a triangle or trapenzoid as the case may be). Otherwise, it can be defined as IL or IR admitting some error.

The hidden-surface processing device having the constructions as mentioned above has a disadvantage that the processing using error data such as antialiasing cannot be performed using only the data directly obtained from the device.

The above anti-aliasing method requires decision relative to XMIN and XMAX, and also requires to calculate Y0, Y1 and Y2 if the boundary of the plane segment extends over plural pixels as shown in FIG. 13B; this calculation is time-consuming and so is difficult to carry out in real time. Further, if the data corresponding to one scan line are successively output, it is necessary to once store the data somewhere for the anti-aliasing processing. Further, the graphic display device in which the luminance is omitted in its decimals generates the state as shown in FIG. 14. Specifically, up to the pixel A is painted for boundary 1 while up to the pixel B is painted for boundary 2. In this case, if the aliasing is removed by the above conventional anti-aliasing method, the luminance of the pixel A can be corrected at the boundary 1 and that of the pixel C can be corrected for the boundary 2. The corrected color for the pixel B, however, cannot be decided unless the color before drawing the boundary 2 is held.

SUMMARY OF THE INVENTION

An object of the present invention is to provide a hidden-surface processing device which can directly produce luminance data and error data and so can be used to execute the processing requiring the error data such as anti-aliasing processing.

Another object of the present invention is to provide an anti-aliasing method which can continuously execute an anti-aliasing processing using the luminance data corresponding to one scan line and the error data of the plane to be displayed at its boundary which are successively obtained and so is suitable to realtime processing, and can correct the pixel state which can occur as shown in FIG. 14 in a graphic display device in which the luminance is omitted in its decimals for display.

Still another object of the present invention is to provide a three-dimensional graphics processing device which can execute in real-time a hidden-surface processing, smooth shading and anti-aliasing processing.

In accordance with one aspect of the present invention, there is provided a hidden-surface processing device comprising a depth register for holding the depth of a plane segment nearest to each of pixels on the basis of an input of plane segment information on one scan line of the screen; a luminance data register for registering luminance data; an error register for registering errors of the plane segment at its boundary and their related error information; an adder for deciding whether or not the pixel processor is within a range where a plane segment is located, adding displacement in the depth, comparing depth data and adding a displacement in luminance data in a time division manner; input/output means for updating information on an input plane segment token and outputting the updated information through one stage pipeline register; a luminance data bus for externally outputting the contents of the luminance register; and a error data bus for externally outputting the contents of the error register.

In accordance with another aspect of the present invention, there is provided an anti-aliasing method comprising the steps of error decision of, on the basis of errors of the coordinate values of two successive pixels on one scan line and error information deciding if the errors are due to a left boundary, a right boundary or the part other than the boundaries, deciding a combination of said items of error information and selecting errors of said two pixels; correction calculation of, on the basis of an input of said errors and pixel information of said two pixels, calculating an average (proportional distribution) of said pixel information between said two pixels in their area using said decision result; and replacement output of, on the basis of the said decision result, said correction calculation result and said pixel information, outputting said pixel information of said two pixels after it has been decided whether or not they should be replaced by the correction calculation result.

In accordance with still another aspect of the present invention, there is provided a three-dimensional graphics processing apparatus comprising a hidden-surface processing device; an error decision device for deciding, on the basis of inputs of errors En, En+1, and items of error information Fn, Fn+1, a combination of the items of error information Fn, Fn+1 thereby to select En if the combination is that of a right boundary and the part other than boundaries or that of a right boundary and a right boundary, En+1 if the combination is that of the part other than boundaries and a left boundary, or that of a left boundary and a left boundary, and a larger one of En and En+1 if the combination is that of a right boundary and left boundary; a correction calculation device for calculating, on the basis of inputs of the error En or En+1 selected by the error decision device and luminance data In, In+1, I={(In+In+1)+Ex(In- −In+1)}/2 (where x=n or n+1); and a replacement output device, on the basis of inputs of the decision by the error decision device, the calculation result I by the correction calculation device and the luminance data In, In+1, for outputting the luminance data In replaced by the calculation result I by the correction calculation device if the combination of Fn and En+1 is that of a right boundary and the part other than boundaries, or that of a right boundary and a right boundary, the luminance data In+1 replaced by I if the combination is that of the part other than boundaries and a left boundary, or that of a left boundary and a left boundary, both luminance data In and In+1 replaced by I if the combination is that of a right boundary and a left boundary, and outputting the luminance data In and In+1 without being replaced by I in other cases, where among luminance data, error data and their information representing if the error is due to a left boundary, a right boundary or that other than the boundaries corresponding to one scan line outputted from the hidden-surface processing device, the In and In+1 (n:integer≧0) are two successive pixels, En and En+1 are errors in the coordinates of the respective pixels, and Fn and Fn+1 are their error related information.

BRIEF DESCRIPTION OF THE DRAWINGS

FIGS. 3A and 3B are tables for explaining classification of error information and input tokens, respectively, in the first embodiment;

FIG. 7 is a system block diagram of three-dimensional graphics processing apparatus according to the third embodiment of the present invention;

FIG. 8 is a block diagram of the prior art hidden-surface processing device;

FIG. 11 is a table for explaining an input token in the prior art hidden-surface processing device;

DESCRIPTION OF THE PREFERRED EMBODIMENTS

Figure 1:
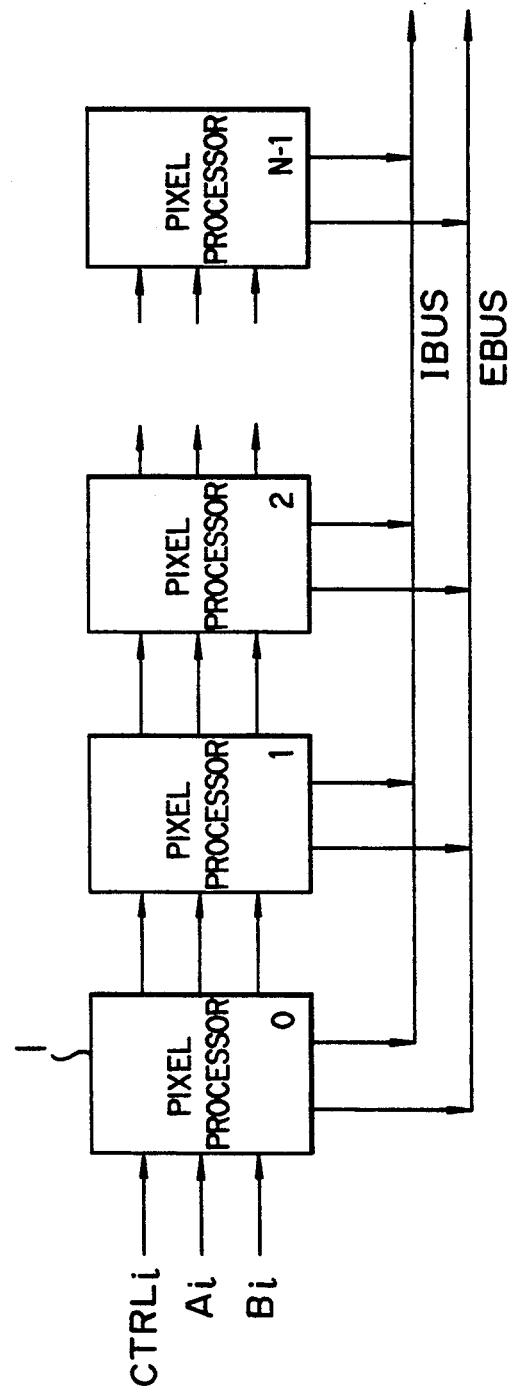
FIG. 1 is a block diagram of a hidden-surface processing device according to the first embodiment of the present invention.

FIG. 1 is a system block diagram of the hidden-surface processing device according to the first embodiment of the present invention.

Figure 2:
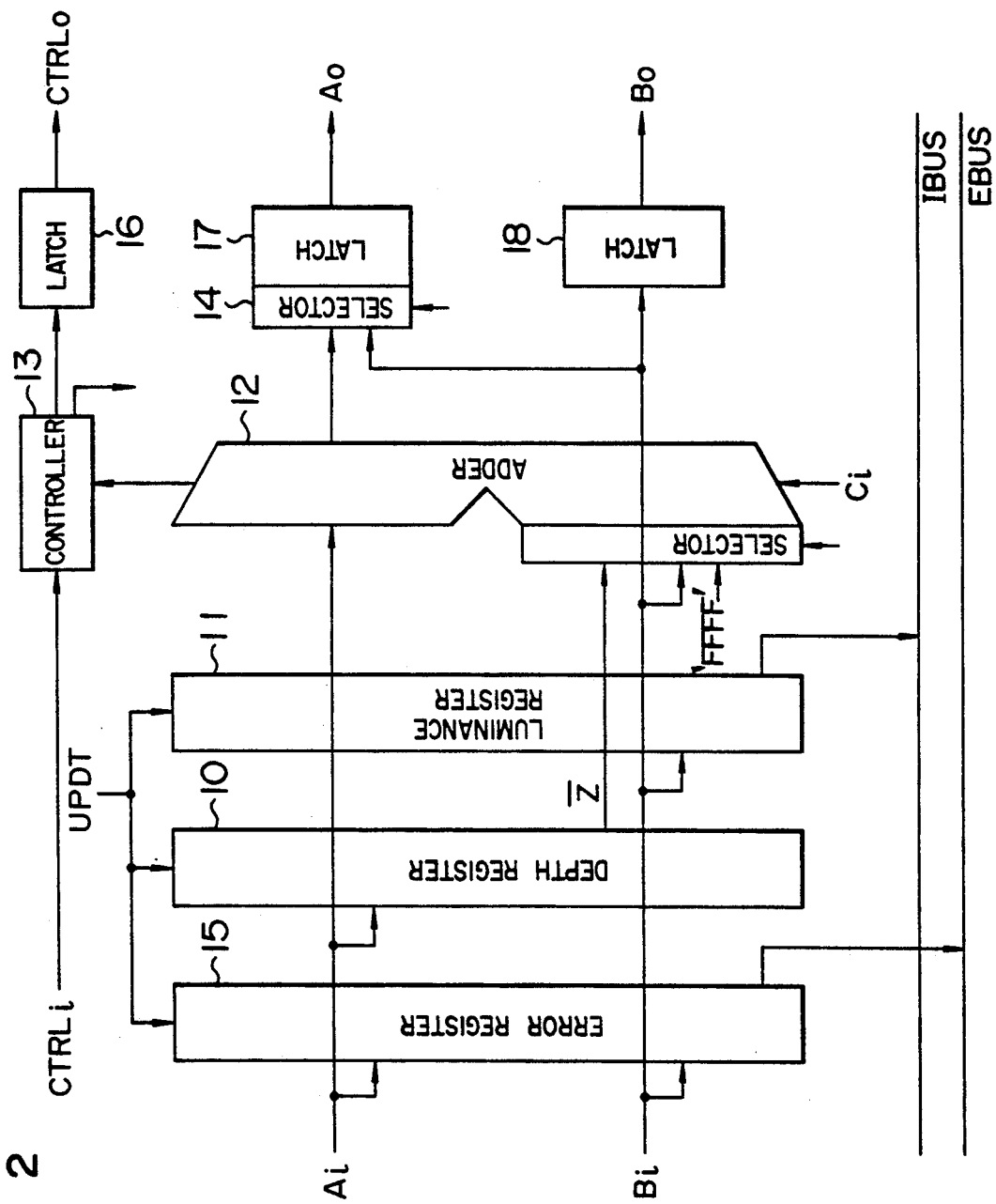
FIG. 2 is a block diagram of an array of pixel processors according to the first embodiment.

FIG. 2 is a view showing the details of each of pixel processors which constitute the hidden-surface processing device. In FIGS. 1 and 2, 1 is a pixel processor corresponding to each of N pixels on one scan line; 10 is a depth register for registering the depth coordinate of a plane nearest to pixel positions; 11 is a luminance register for registering the luminance information of the plane; and 12 is an adder for deciding whether or not the pixel processor is within a range where a plane segment is located, adding displacement in the depth, comparing depth data and adding a displacement in luminance data in a time division manner; 15 is an error register for registering an error of the plane at its boundary and error information representing whether the error is due to the left boundary of the plane or the right boundary thereof.

Explanation will be given for the operation of the hidden-surface processing device according to this embodiment.

Now it is assumed that a token has as information of a plane segment, elements of a left end point coordinate (XL, ZL), the number of successive pixels (dX), a z-coordinate displacement for each pixel (Z'), luminance information I at the left end point, and a luminance displacement I' for each pixel, an error EL at the left end point (left boundary), and an error ER at the right end point (left boundary). The token having these items of information is input in a manner divided into an A input port Ai and a B input port Bi to a left end pixel processor 1 of the pixel processors formed in an array as shown in FIG. 1. It should be noted that error information is included in high order two bits of the error EL at the left end point and of the error ER at the right end point. The error information can be tabulated as shown in FIG. 3a. Control information CTRLi includes IN flag information indicative of that the corresponding pixel processor 1 is within a range where the plane segment in question is located. The information given to the respective ports in a time divisional manner are tabulated as shown in FIG. 3B.

The operation of the pixel processor will be explained with reference to FIG. 2.

At a first timing T1, data at the A input port Ai and an all 1 pattern are supplied to an adder 12 to provide the subtraction result of the A input data minus 1. If the IN flag=0, and the subtraction result is negative, it means that the pixel processor has entered the range where the plane segment is located. Then, the data dX at the B input port Bi is shifted to the A port by the selector 14 to enter the latch 17. Also the IN flag is inverted to 1 to enter the latch 16. If the IN flag=1, and the subtraction result is negative, it means that the pixel processor has gone out from range where the plane is located. Then, the IN flag is inverted to 0 to output the negative value (the maximum value in integers with no sign) to the A output port as it is. In other cases, the CTRLi is output to CTRLo as it is and the addition result is output to the A output port Ao.

At a second timing T2, if the IN flag=1, Z at the A input port Ai and Z' at the B input port Bi are added to produce the addition result at the A output port Ao. If the IN flag=0, Z at Ai is output to Ao as it is without being updated.

At a third timing T3, Z at Ao at the timing T2 is held as it is. Then, with the IN flag=1, Z at Ai and Zb in the depth register 10 are compared by the adder 12. If the comparison result is Z<Zb, Z at Ai will be stored in the depth register 10.

At a fourth timing T4, if the IN flag=0 and the above comparison result is Z<Zb, I at the B input port Bi will be stored in the luminance register 11, and I at Ai and I' at Bi are added to produce the addition result at Ao. In other cases, I at Ai is output to Ao as it is without being updated.

Finally, at a fifth timing T5, when the IN flag is inverted from 0 to 1, i.e. when at the first timing T1, IN flag=0 and the subtraction result of X is negative, and also if the comparison result at the third timing T3 is Z<Zb, EL on the A input port is stored in the error register 15 to update the contents thereof. Also when the IN flag is inverted from 1 to 0, i.e. when the IN flag=1 and the subtraction result of dX is negative, and also the comparison result at the third timing T3 is Z<Zb, ER on the B input port is stored in the error register 15 thereby to update the contents thereof. In other cases, EL at Ai and ER at Bi are outputted to the A output port Ao and the B output port Bo as they are.

Figure 4A:
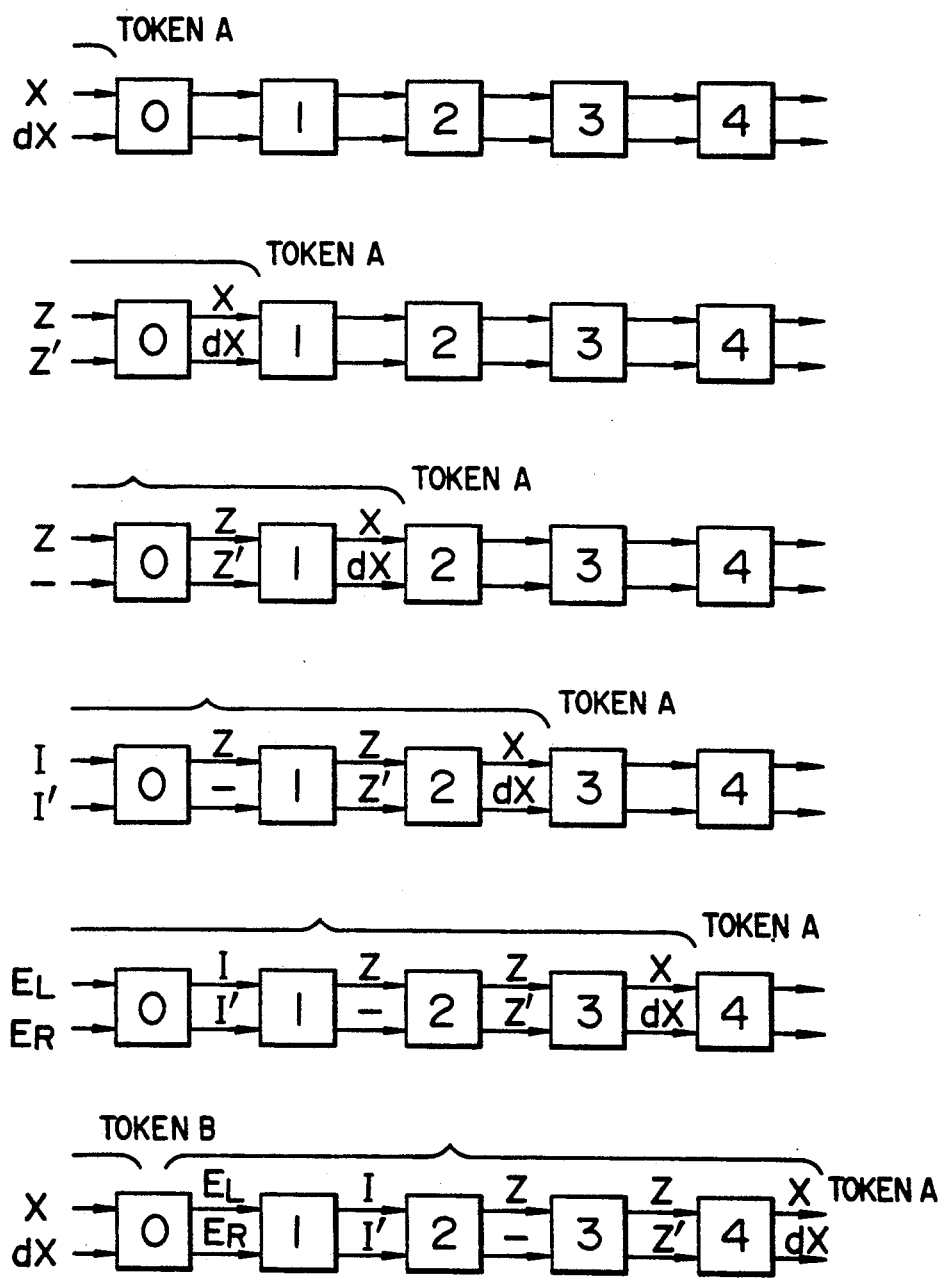
FIGS. 4A and 4B are views showing the state where tokens flow through pixel processors in the first embodiment.

FIG. 4A shows the state where the token having the plane segment information as described above flows along the array of pixel processors while being subjected to the processing by each pixel processor.

As understood from the above description, it is possible to insert, in the timing slot of T2 or T3 unused on the bus of the CTRL signal, a discriminator for discriminating whether the token is a plane segment or a sweep token.

Figure 4B:
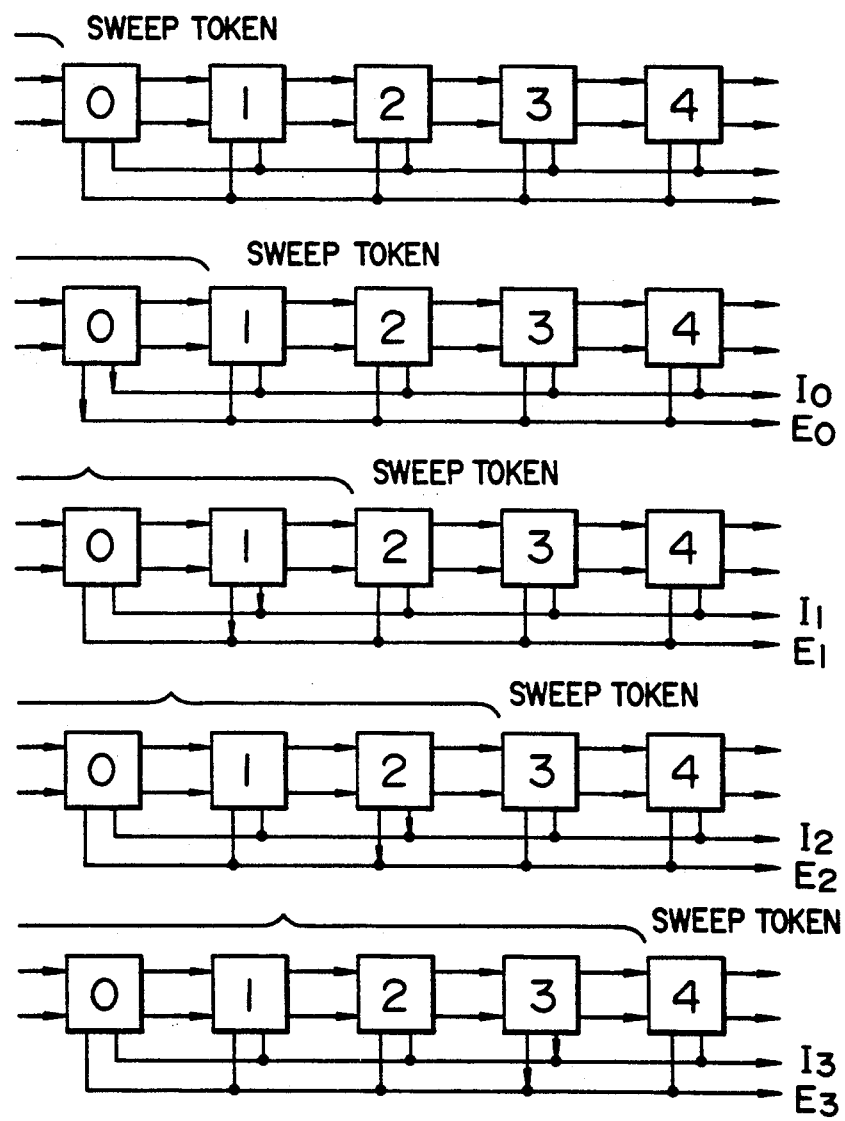

Referring to FIG. 2 and FIG. 4B, explanation will be made on the operation of each pixel processor when it receives the sweep token.

At the first timing T1, the number of displayed pixels on one scan line is received in place of X, and 1 is subtracted from it to count the remaining number of displayed pixels. Then, that the subtraction result is negative means that the sweep token has deviated from the display range so that the IN flag is inverted to 0.

At the second timing T2, if the sweep token is within the display range with IN flag=1, the pixel processor 1 sends the contents in the luminance register 11 to the luminance data bus IBUS and those of the error register 15 to the error data bus EBUS.

At the third timing T3, if the sweep token is within the display range with IN flag=1, an initial value Z Back is stored in the depth register 10.

At the fourth timing T4, if the sweep token is within the display range with IN flag=1, an initial value I Back is stored in the luminance register 11.

At the fourth timing T5, the sweep token is within the display range with IN flag=1, all the bits in the error register 15 are initialized to 0.

In this way, the sweep token moves to the adjacent pixel processor for each timing, so that the luminance to be displayed for each pixel and the error at the boundary are successively output from the luminance data bus and the error data bus. Therefore, if the above process is carried out from scan lines corresponding to one image plane, and this is repeated, the luminance data and the errors at the boundary of a plane to be displayed can be simultaneously obtained. Thus, the processing requiring to use errors such as anti-aliasing can be executed at a very high speed.

Figure 5:
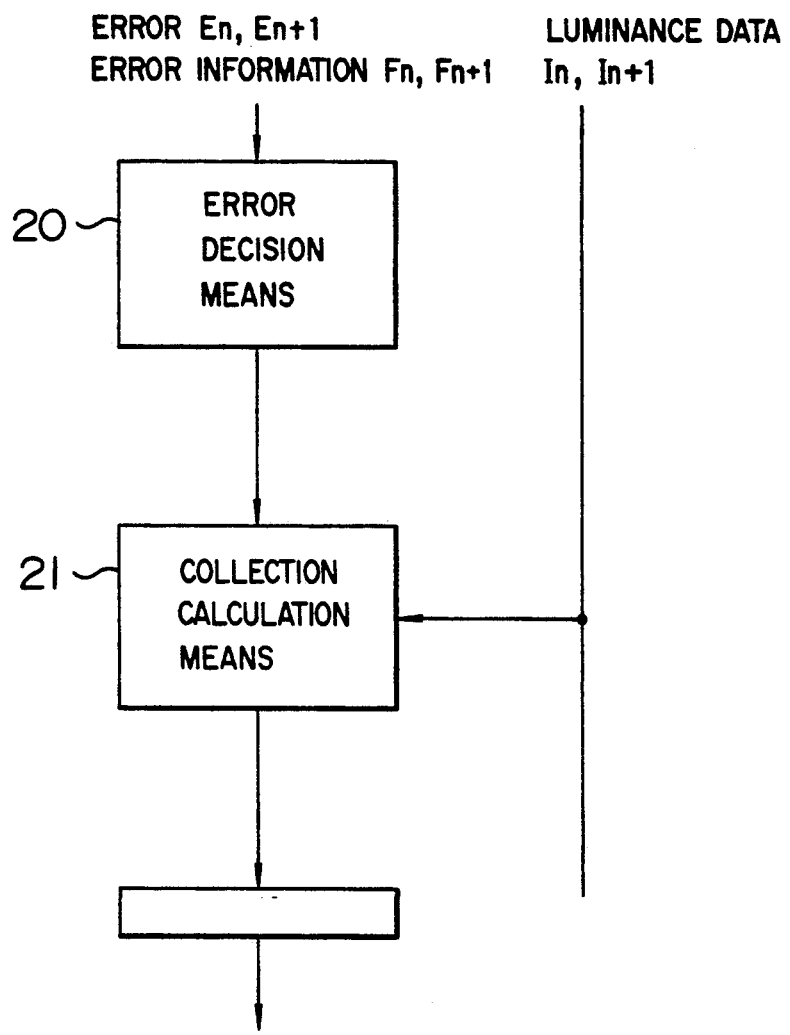
FIG. 5 is a schematic block diagram of an arrangement of the second embodiment of the present invention.

Now referring to FIGS. 5 and 6, explanation will be given for the anti-aliasing method according to the second embodiment of the present invention. FIG. 5 is a block diagram for explaining the process of the anti-aliasing method according to this embodiment. FIG. 6 is a view for explaining the correction calculation used in the anti-aliasing method according to this embodiment.

It is assumed that the luminance data for two successive pixels on one scan line are In and In+1 (n:integer≧0) and the errors of the values for these pixels are En and En+1. The error of the coordinate value is a distance from the center of a pixel on which a boundary is displayed to the boundary along the center line of a scan line (see FIG. 6). It should be noted that if the decimals thereof are rounded off for display, the distance takes a plus or minus sign. Specifically, the sign is plus or minus according as the boundary is located on the right or left side of the pixel center. If the decimals of the distance are omitted for display, the sign may be only plus. The information deciding if the error is due to a left boundary, a right boundary or the part other the boundaries is referred to as error information. It is assumed that the respective items of information corresponding to the above two pixels are Fn and Fn+1. In this case, the combinations of Fn and Fn+1 are classified as follows.

(1) Fn:other than boundaries, Fn+1:left boundary
(2) Fn:left boundary, Fn+1:left boundary
(3) Fn:right boundary, Fn+1:other than boundaries
(4) Fn:right boundary, Fn+1:right boundary
(5) Fn:right boundary, Fn+1:left boundary
(6) combination other than the above combinations Error decision means 20 decides the combination on the basis of inputs of the errors En and En+1, and the error information Fn and Fn+1 according to the above classification. If the decision result is (1) or (2), En+1 is selected. If it is (3) or (4), En is selected. If it is (5), a not smaller one of En and En+1 is selected. If it is (6), either may be selected. The selected error is sent to correction calculation means 21. The correction calculation means 21 performs, on the basis of inputs of the error Ex (x=n or n+1) output from the error decision means 20 and the luminance data In, In+1 as described above, the following calculation (*)

$$I = \{(I_n + I_{n+1}) + E_x*(I_n - I_{n+1})\}/2 \ldots \quad (*)$$

where x=n or n+1

Figure 6A:
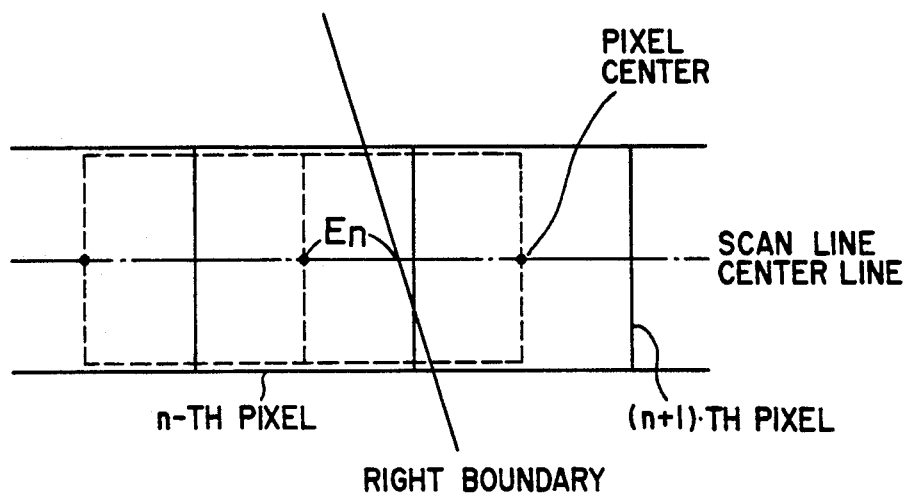
FIGS. 6A and 6B are views for explaining correction calculation in the second embodiment of the present invention.

Equation (*) will be explained with referring to FIGS. 6A and 6B. FIG. 6A show the case of the above class (3). In this case, the n-th and (n+1) pixels are parallel-shifted to left by ½ of the pixel width (so as to form a square indicated by a dotted line). Using the area ratio of the parallel-shifted pixels, the luminance is determined like Equation (*).

Figure 6B:
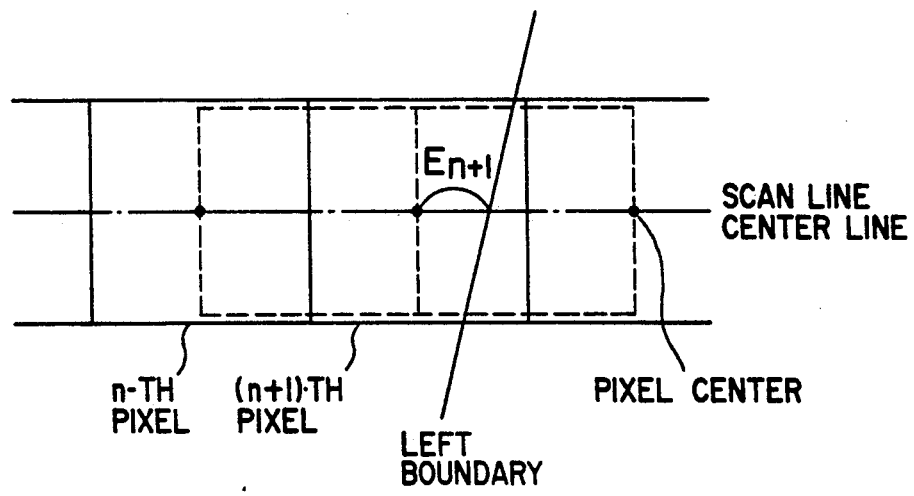
Figure 9:
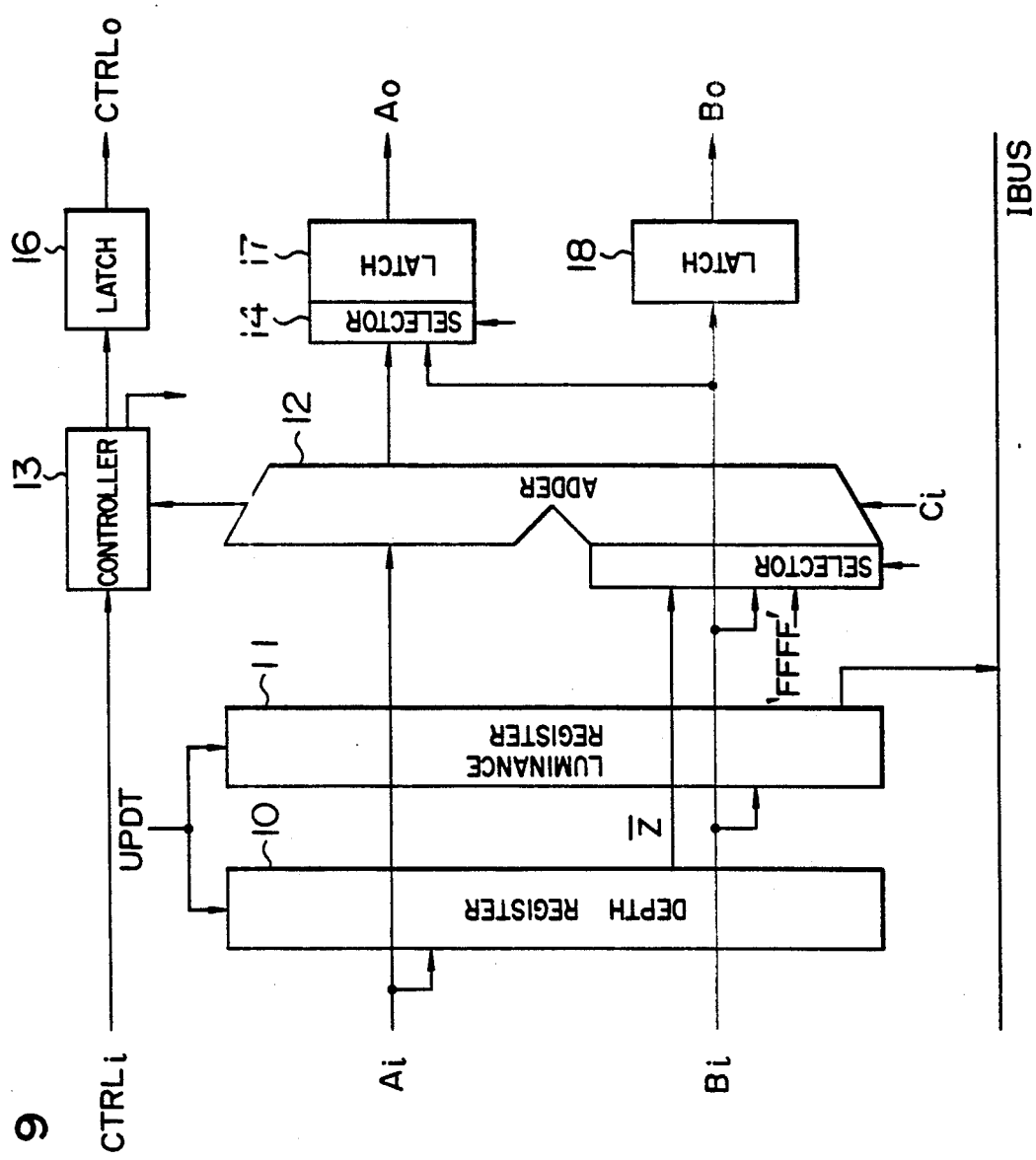
FIG. 9 is a block diagram of the pixel processor in the prior art hidden-surface processing device.
Figure 10:
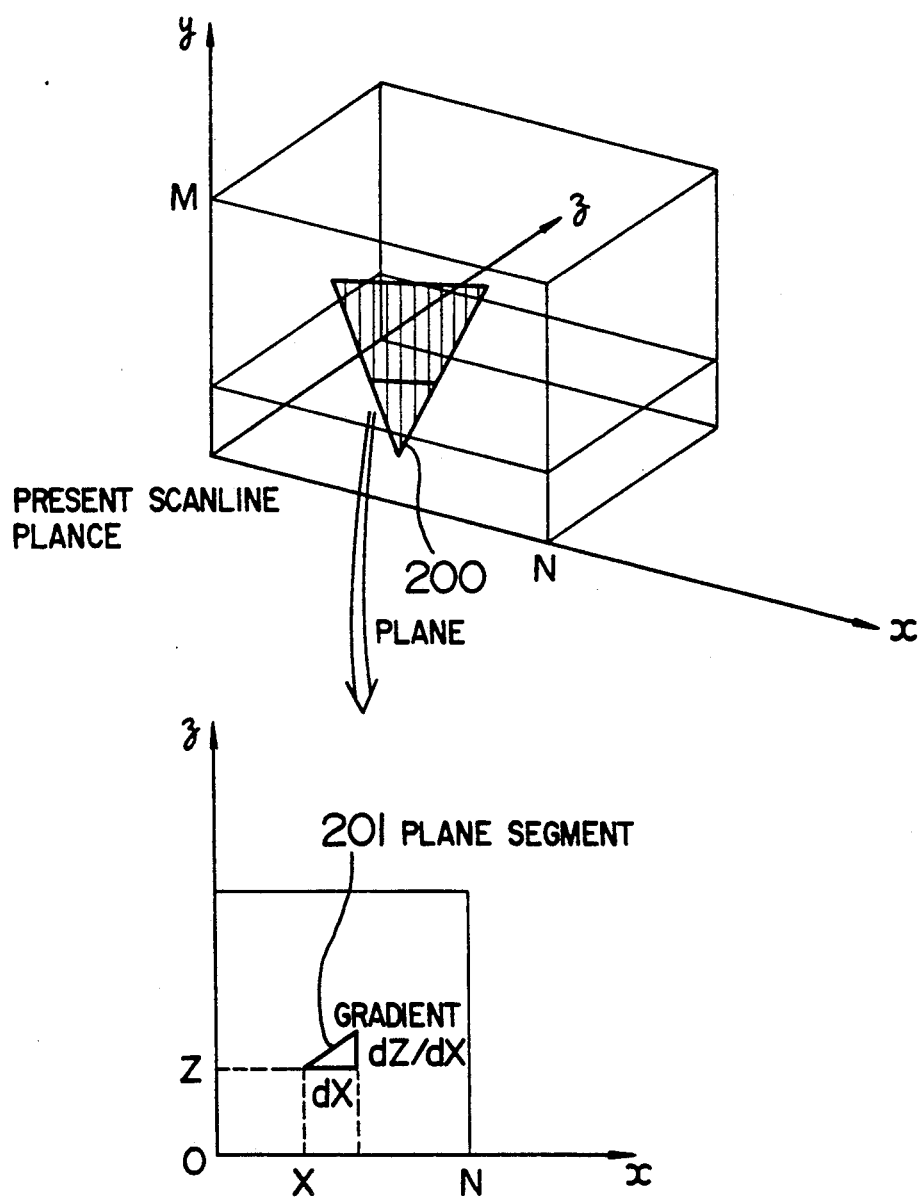
FIG. 10 is a view for explaining the concepts common to the present invention and the prior art.
Figure 12A:
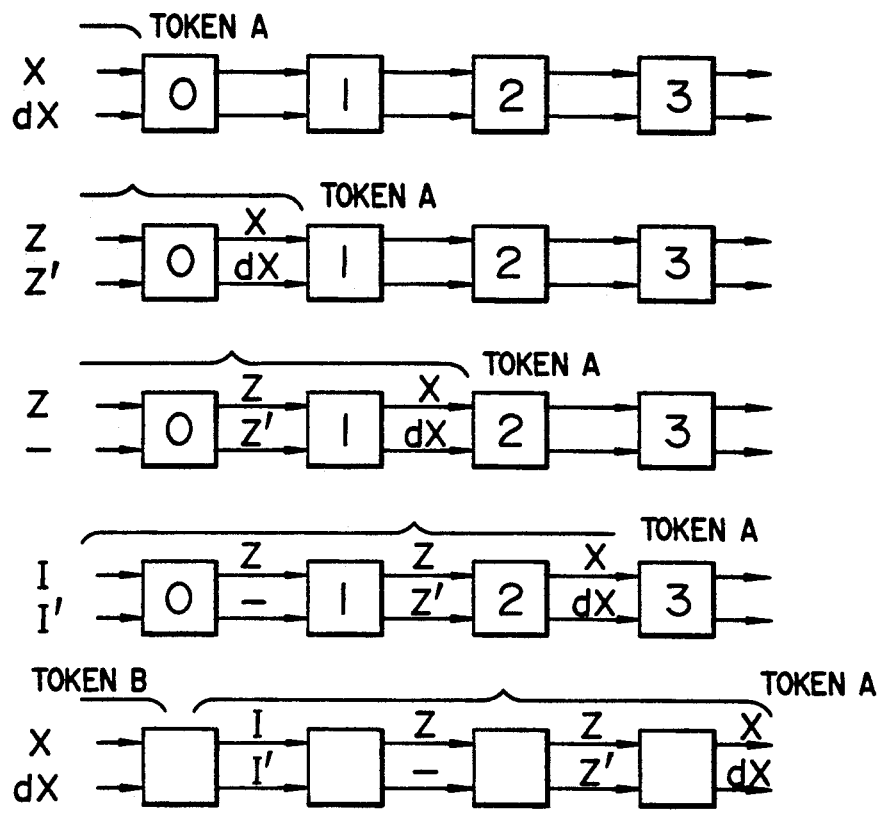
FIGS. 12A and 12B are views showing the state where tokens flow through pixel processors in the prior art hidden-surface processing device.
Figure 12B:
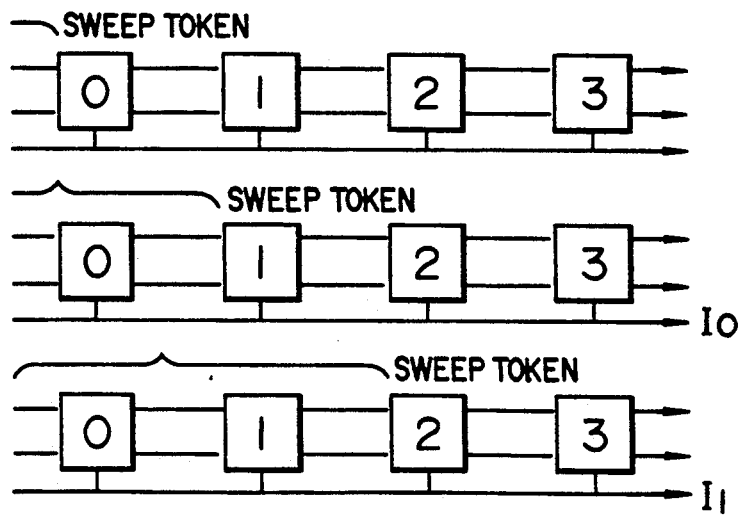
Figure 13A:
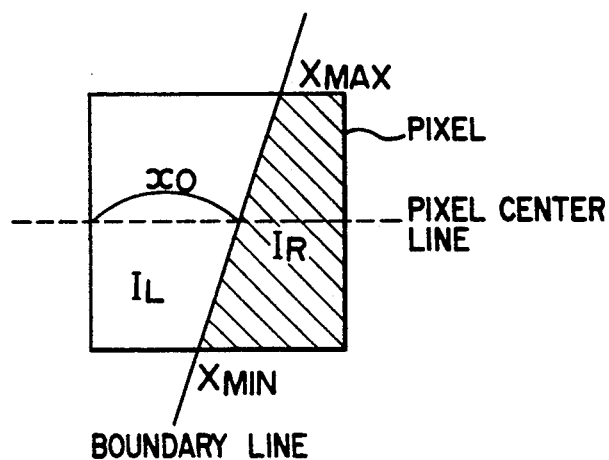
FIGS. 13A and 13B are views for explaining the prior art anti-aliasing method.
Figure 13B:
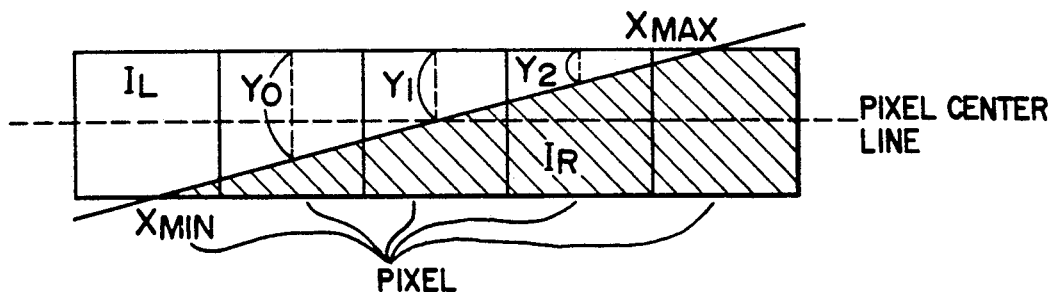

FIG. 6B show the case of the above class (1). In this case, the n-th and (n+1) pixels are parallelshifted to right by ¼ of the pixel width (so as to form a square indicated by a dotted line). Using the area ratio of the parallel-shifted pixels, the luminance is determined like Equation (*). Likewise, with respect to the classes (2) and (4), the luminance can be determined. On the other hand, in the case of the class (5), the luminance is determined using the larger error. Incidentally, the above equation is approximate in accordance with the gradient of the boundary line.

The result I of Equation (*) calculated by the correction output means 22 is sent to replacement output means 22. The replacement calculation means 21, on the basis of inputs of the calculation result of Equation (*), and In and In+1, replaces In+1 by I if the class decided by the error decision means 20 is (1) or (2), In by I if the class is (3) or (4), both In and In+1 by I if the class is (5), and outputs them as they are without being replaced it the class is (6).

Figure 14:
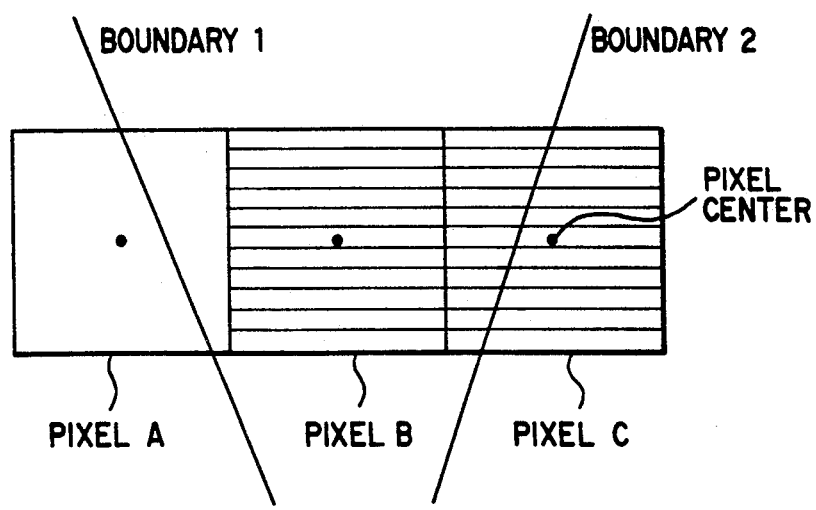
FIG. 14 is a view for explaining the case which cannot be processed by the prior art anti-aliasing method.

In this way, the correction calculation for anti-aliasing is made using successive two pixels and the calculation result is replaced by original data to provide the data after the anti-aliasing. Therefore, successive data are successively processed so that anti-aliasing can be performed for the case as shown in FIG. 14.

Finally, explanation will be given for the three-dimensional graphics processing apparatus according to the third embodiment of the present invention. FIG. 7 is a system block diagram of the three-dimensional graphics processing apparatus according to this embodiment. In FIG. 7, 30 is the hidden-surface processing device according to the first embodiment. The operation of the three-dimensional graphics processing apparatus will be explained in connection with FIG. 7.

First, plane segment information corresponding to one scan line are input in a manner divided into an A input port Ai and a B input port Bi on the left side of the hidden-surface processing device according to the first embodiment. As previously described, it should be noted that the plane segment information is tokens each having elements of a left end point coordinate (XL, ZL), the number of successive pixels (dX), a z-coordinate displacement for each pixel (Z'), luminance information I at the left end point, and a luminance displacement I' for each pixel, an error EL at the left end point (left boundary), and an error ER at the right end point (right boundary). Further, it should be also noted that high order bits of the error EL at the left terminal point and the error ER at the right terminal point include the error information as tabulated in FIG. 3A.

When sweep tokens are input subsequently to the plane segment tokens, luminance data and boundary error data corresponding to one scan line are successively output from the luminance data bus (IBUS) and the error data bus (EBUS) of the hidden-surface processing device 30, respectively. It is assumed that the luminance data successively output from the luminance data bus (IBUS) are I0, I1, I2, ..., the error data successively output the error data bus (EBUS) are E0, E1, E2, ..., and items of the error information are F0, F1, F2, ... The luminance data In and In+1 of successive two pixels from the luminance data bus (IBUS) are stored in an I register B 42 and an I register A 41. During this period, En, En+1 and Fn, Fn+1 from the error data bus (EBUS) are stored in an E register B 32, an E register A 31, an F register B 34 and an F register A 33, respectively. The contents of error information stored in the F register B 34 and the F register A 33 are decided by an error information decision device 35 as follows.

(1) when Fn=00, Fn+1=10,
(2) when Fn=10, Fn+1=10,
(3) when Fn=01, Fn+1=00,
(4) when Fn=01, Fn+1=01,
(5) when Fn=01, Fn+1=10,
(6) other cases The error information decision device 35 sends the decision result to a selector A 36. The selector A 36 selects the contents of the E register A 31 or the E register B 32. Specifically, if the decision result is (1) or (2), En+1 from the E register A 31 is selected; if it is (3) or (4), En from the E register B 32 is selected; if it is (5), a larger one of En and En+1 is selected; and if it is (6), either may be selected. The selected En or En+1 will be sent to an E register C37. On the other hand, the decision result by the error information decision device 35 is also sent to a K register A 37. During these processings, the contents of both I register B 42 and I register B 41 are sent to a subtractor 43 and an adder A 44, and also successively sent to an I register E 47. The subtractor 43 calculates In−In+1 to send the result to an I register C 45. The adder A 44 calculates In+In+1 to send the result to an I register D 46. The contents of the I register C 45 and ET (T=n or n+1) selected by the selector A 36 which is the contents of the I register C 37 are multiplied together by a multiplier 48 thereby send the result of (In−In+1)*ET(T=n or n+1) to an I register F 49. During this processing, the contents of the K register A 38 are sent to a K register B 39; those of the I register D 46 are sent to an I register G 50; and those of the I register E 47 are sent to an I register H 51. The contents of both the I register F 49 and the I register G 50 are sent to an adder B 52 with a one-bit right shifter which calculates {(In+In+1)+(In−In+1-)*ET}/2(T=n or n+1); this result will be sent to an I register I 53. During this addition processing, the contents of the K register B 39 are a K register C 40 and those of the I register H 51 are sent to an I register J 54. Next, the decision result by the error decision device 35, which is the contents of the K register C 40, is sent to a selector B 56. The selector B 56 stores two decision results with a priority of the decision result early stored, and selects I, In or In+1 in the following manner.

If the decision result sent from the K register C 40 is (1) or (2), the contents In of the I register J 54 are selected to be sent to a display device. At the next timing, I which has been from the I register I 53 to the I register K 55 is selected in place of In+1 to be sent to the display device. If it is (3) or (4), I which is the contents of the I register I 53 is selected in place of In which is the contents of the I register J 54 so as to be sent to the display device. If it is (5), I which is the contents of the I register I 53 is selected in place of In which is the contents of the I register J 54 so as to be sent to the display device. At the next timing also, the I, which has been sent from the I register I 53 to the I register K 55, is selected in place of In+1 so as to be sent to the display device. If it is (6), the contents of the I register J 54 are successively selected to be sent to the display device. In short, if the decision result is (1) or (2), I is outputted in place of In+1; if it is (3) or (4), I is outputted in place of In; if it is (5), I is outputted in place of both In and In+1; and if it is (6), In and In+1 are outputted as they are.

If the above process is executed for scan lines corresponding to one image plane and it is further repeated, a three-dimensional polyhedral object, while being subjected to a hidden-surface processing, a smooth shading processing and anti-aliasing processing, can be displayed on a two-dimensional display screen in real time.

As understood from the above description, the hidden-surface processing device according to the present invention comprises an error register which can store errors of a plane segment on one scan line nearest to pixels at its boundaries, and error information indicative of whether the error is due to a left boundary or a right boundary, and an error data bus which can read the storage contents together with the luminance data.

Further, the anti-aliasing method according to the present invention executes correction for boundaries on the pixels using two successive pixels on one scan line so that it is not necessary to decide whether the boundary is located within one pixel or extended over plural pixels and it is possible to obviate troublesomeness in correction calculation where the boundary is extended over plural pixels. The correction can be made for the case as shown in FIG. 14 in a graphic processing apparatus providing a display with decimals omitted. Further, it is possible to successively process one-scan-line data successively produced.

In accordance with the present invention, when plane segment information on one scan line supplied to a hidden-surface processing device is processed to provide luminance data and error data in real time so that anti-aliasing processing can be continuously executed using these data successively produced. Thus, the hidden surface processing, smooth shading processing and the anti-aliasing processing can be carried out in real time.

In accordance with the hidden-surface processing device of the present invention, the luminance of a plane to be displayed at a high speed and errors at its boundaries are obtained which can be used for anti-aliasing processing. Further, an accordance with the anti-aliasing method of the present invention, even when the luminance data and the error data corresponding to one scan line are successively produced, the anti-aliasing can be executed without being stored somewhere, and so in real time. Further, in accordance with the three-dimensional graphics apparatus of the present invention, a three-dimensional polyhedral object, while being subjected to hidden-surface processing, smooth shading and anti-aliasing, can be displayed in a real time on a two-dimensional display screen. In this way, the present invention can provide very great industrial effects.

We claim:

1. An anti-aliasing method comprising: obtaining data relating to a first and a second of two successive pixels on one scan line, said data comprising pixel information of said two successive pixels, coordinate round-off errors of coordinate values of said two successive pixels indicating the difference between (1) an actual boundary of a line segment enclosing a displayed portion of a polygon and (2) a boundary formed by a pixel coordinate, and items of error information of said two pixels indicating whether said coordinate round-off errors arise from a left boundary of a line segment, a right boundary of a line segment, or an area other than the left boundary or the right boundary;

identifying a combination of items of error information of said two successive pixels to obtain an identifying result for said two successive pixels;

selecting one of said coordinate round-off errors of said two pixels in accordance with said identifying result;

calculating, on the basis of said one of said coordinate round-off errors of said two pixels and pixel information relating to luminance values of said two pixels, an average pixel information between said two pixels by area in accordance with said identifying result; and replacing, on the basis of said identifying result, said pixel information with said average pixel information.

2. An anti-aliasing method comprising the steps of:

(a) obtaining data relating to two successive pixels n, n+1 on a scan line comprising pixel information In, In+1 of said two successive pixels, coordinate round-off errors En, En+1 of said two successive pixels, indicating a difference between an actual boundary of a line segment enclosing a displayed portion of a polygon and a boundary formed by a pixel coordinate, and items or error information Fn, Fn+1 of said two successive pixels indicating whether said coordinate round-off errors arise from a left boundary of a line segment, a right boundary of a line segment, or an area other than a left boundary or a right boundary;

(b) identifying, on the basis of said coordinate round-off errors En, En+1, and said items of error information Fn, Fn+1, a combination of the items of error information Fn, Fn+1 and selecting (i) En if the combination is that of a right boundary followed by an area other than boundaries or that of a right boundary followed by a right boundary, (ii) En+1 if the combination is that of an area other than boundaries followed by a left boundary, or that of a left boundary followed by a left boundary, and (iii) a not smaller one of En and En+1 if the combination is that of a right boundary followed by a left boundary;

(c) calculating, on the basis of the coordinate round-off error En or En+1 selected in step (b) and said luminance data In, In+1 for said two successive pixels on said scan line, a calculation result $I \leq \{(In+In+1)+Ex(In-In+1)\}/2$ (where x=n or n+1); and (d) outputting, on the basis of the combination identified in step (b), the calculation result I and the luminance data In, In+1, (i) the luminance data In replaced by the calculation result I if the combination of Fn and Fn+1 is that of a right boundary followed by an area other than boundaries, or that of a right boundary followed by a right boundary, (ii) the luminance data In+1 replaced by I if the combination is that of an area other than boundaries followed by a left boundary, or that of a left boundary followed by a left boundary, (iii) both luminance In and In+1 replaced by I if the combination is that of a right boundary followed by a left boundary, and (iv) the luminance data In and In+1 without being replaced by I in other cases.

3. In a graphics display device for displaying a three-dimensional polyhedral object, comprising at least one polygon having boundaries, on a two-dimensional screen, a three-dimensional graphics processing apparatus comprising:

a hidden-surface processing device including means for obtaining information relating to a plurality of pixels in a line segment by intersecting a polygon of said object with a scan line plane for each scan line, the information including elements of a position of a head pixel of said plurality of pixels, a number of successive ones of said plurality of pixels, a depth corresponding to the head pixel, a depth displacement for each of said successive ones of said plurality of pixels relative to said head pixel, luminance data corresponding to the head pixel, a luminance displacement for each of said successive ones of said plurality of pixels relative to said head pixel, error data corresponding to the head pixel and error data corresponding to an end pixel of said plurality of pixels, and means for performing hidden-surface processing and smooth shading on said plane segment to obtain pixel data for each pixel n of said plurality of pixels, said pixel data comprising a luminance value $I_n$, a coordinate round-off error $E_n$, and an item of error information $F_n$, wherein said error information of item $F_n$ indicates whether said error $E_n$ is due to a right boundary of a line segment, a left boundary of a line segment or an area other than boundaries;

a first correction calculation device for receiving said pixel data for two successive pixels $n$, $n+1$ of said plurality of pixels and for identifying a combination of items of error information $F_n$, $F_{n+1}$ corresponding to errors $E_n$, $E_{n+1}$ and for selecting (i) $E_n$ if the combination is that of a right boundary followed by an area other than boundaries or that of a right boundary followed by a right boundary, (ii) $E_{n+1}$ if the combination is that of an area other than boundaries followed by a left boundary, or that of a left boundary followed by a left boundary, and (iii) a not smaller one of $E_n$ and $E_{n+1}$ if the combination is that of a right boundary followed by a left boundary;

a second correction calculation device for calculating, on the basis of the error $E_n$ or $E_{n+1}$ selected by said first correction calculation device for said two successive pixels, a calculation result $I=\{(I_n+I_{n+1})+E_x \times (I_n-I_{n+1})\}/2$, where $x=n$ or $n+1$ and where $I_n$ and $I_{n+1}$ (n:integer$\geq 0$) are the luminance data of said two successive pixels $n, n+1$; and a replacement output device for receiving the combination identified by said first correction calculation device, the calculation result I, and the luminance data $I_n$, $I_{n+1}$, and outputting (i) the luminance data $I_n$ replaced by the calculation result I if the combination of $F_n$ and $F_{n+1}$ is that of right boundary followed by an area other than boundaries, or that of a right boundary followed by a right boundary, (ii) the luminance data $I_{n+1}$ replaced by I if the combination is that of an area other than boundaries followed by a left boundary, or that of a left boundary followed by a left boundary, (iii) both luminance data $I_n$ and $I_{n+1}$ replaced by I if the combination is that of a right boundary and followed by a left boundary, and (iv) the luminance data $I_n$ and $I_{n+1}$ without being replaced by I in other cases.

4. An anti-aliasing apparatus comprising:

error handling means, responsive to coordinate round-off errors of two successive pixels on one scan line, indicating a difference between an actual boundary of a line segment enclosing a displayed portion of a polygon and a boundary formed by a pixel coordinate, each of said two successive pixels having error information which indicates whether said coordinate round-off errors arise from a left boundary of a line segment, a right boundary of a line segment, or an area other than a left boundary of a line segment or a right boundary of a line segment, for identifying a combination of said error information of said two successive pixels and selecting one of said coordinate round-off errors of said two successive pixels in accordance with said combination;

correction calculation means, responsive to said error handling means, for receiving an error value corresponding to said one of said errors selected by said error handling means, for receiving pixel information of said two successive pixels and for calculating an average pixel information by area of said two successive pixels; and replacement output means for either replacing said pixel information corresponding to said successive two pixels with said average pixel information or outputting said pixel information without replacement in accordance with said combination identified by said error handling means.

5. An anti-aliasing apparatus comprising:

error handling means, responsive to coordinate round-off errors $E_n$ and $E_{n+1}$ of two successive pixels $n$, $n+1$ on one scan line, indicating a difference between an actual boundary of a line segment enclosing a displayed portion of a polygon and a boundary formed by a pixel coordinate, and items of error information $F_n$ and $F_{n+1}$ indicating whether the coordinate round-off errors arise from a left boundary of a line segment, a right boundary of a line segment, or an area other than a boundary, for identifying a combination of $F_n$ and $F_{n+1}$ and for (i) selecting said error value $E_n$ when said combination is derived from a right boundary followed by an area other than a boundary or from a right boundary followed by a right boundary, (ii) selecting said error value $E_{n+1}$ when said combination is derived from an area other than a boundary followed by a left boundary or from a left boundary followed by a left boundary, and (iii) selecting either one of said error value $E_n$ and said error value $E_{n+1}$ which is greater than or equal to the other when the combination is derived from a right boundary followed by a left boundary;

correction calculation means, responsive to said error value $E_n$ or said error value $E_{n+1}$ selected by said error handling means and luminance data $I_n$ and luminance data $I_{n+1}$ corresponding to said two successive pixels $n$, $n+1$ on said one scan line, for calculating a calculated luminance $I=\{(I_n+I_{n+1})+E_x \times (I_n-I_{n+1})\}/2$ (where $x=n$ or $n+1$ and n is not a negative integer); and replacement output means, responsive to said error handling means, said calculated luminance I, said luminance data $I_n$ and said luminance data $I_{n+1}$, for (i) replacing said luminance data $I_n$ with I when said combination of $F_n$ and $F_{n+1}$ identified by said error handling means is derived from a right boundary followed by an area other than a boundary, (ii) replacing said luminance data $I_{n+1}$ with I when said combination is derived from an area other than a boundary followed by a left boundary or from a left boundary followed by a left boundary, (iii) replacing said luminance data $I_n$ and said luminance data $I_{n+1}$ with I when said combination is derived from a right boundary followed by a left boundary, and (iv) outputting said luminance data In and said luminance data In+1 without replacement when said combination is derived from any combination other than one of said combinations specified above.

6. In a graphics display device for displaying a three-dimensional polyhedral object, comprising at least one polygon, on a two-dimensional screen, a three-dimensional graphics processing apparatus comprising:

hidden-surface processing means for inputting segment information for a plurality of pixels on a line segment obtained by cutting a polygon with a scan line plane, said segment information including a position of a head pixel, a number of said plurality of pixels after the head pixel, a depth corresponding to the head pixel, a depth displacement for each of said plurality of pixels after the head pixel relative to the head pixel, luminance data corresponding to the head pixel, luminance displacement for each of said plurality of pixels after the head pixel relative to the head pixel, error data comprising a coordinate round-off error at a left boundary indicating a difference between an actual boundary of a line segment enclosing a displayed portion of said polygon and a boundary formed by a pixel coordinate, and a symbol indicating the left boundary of said line segment, corresponding to the head pixel, and error data comprising a coordinate round-off error at a right boundary and a symbol indicating the right boundary of said line segment, corresponding to an end pixel and for executing hidden-surface processing and shading to obtain pixel data for each pixel n of said plurality of pixels, said pixel data comprising a luminance value In, a coordinate round-off error En, and an item of error information Fn, wherein said item of error information Fn indicates whether said coordinate error En is due to a right boundary of a line segment, a left boundary of a line segment, or an area other than a boundary and outputting said pixel data;

error handling means, responsive to coordinate round-off errors En and En+1 of two successive pixels n, n+1 on one scan line, output from said hidden-surface processing means, and items of error information Fn and Fn+1 for said two successive pixels, for identifying a combination of the items of error information Fn and Fn+1 and for (i) selecting En when said combination is derived from a right boundary of a polygon followed by an area other than a boundary or from a right boundary followed by a right boundary, (ii) selecting En+1 when said combination is derived from an area other than a boundary followed by a left boundary of a polygon or from a left boundary followed by a left boundary, and (iii) selecting either one of En and En+1 which is greater than or equal to the other when the combination is derived from a right boundary followed by a left boundary;

correction calculation means, responsive to the coordinate round-off error En or En+1 selected by said error handling means and luminance values In and In+1 corresponding to said two successive pixels, output by said hidden-surface processing means, for calculating an average luminance I={(In+In+1)+Ex(In−In+1)}/2(where x=n or n+1 and n is not a negative integer); and replacement output means, responsive to said error handling means, said average luminance I and In and In+1, for (i) replacing In with I when a combination of Fn and Fn+1 identified by said error handling means is derived from a right boundary followed by an area other than a boundary, (ii) replacing In+1 with I when said combination is derived from an area other than a boundary followed by a left boundary or from a left boundary followed by a left boundary, (iii) replacing In and In+1 with I when the combination is derived from a right boundary followed by a left boundary, and (iv) outputting In and In+1 without replacement when the combination is derived from any combination other than one of said combinations specified above.

* * * * *